3,325,245
LITHIUM PHOSPHATE CATALYST
Richard L. Rowton, Austin, Tex., assignor to Jefferson Chemical Company, Inc., Houston, Tex., a corporation of Delaware
Original application Oct. 9, 1961, Ser. No. 143,724, now Patent No. 3,238,264, dated Mar. 1, 1966. Divided and this application Apr. 3, 1963, Ser. No. 270,260
2 Claims. (Cl. 23—107)

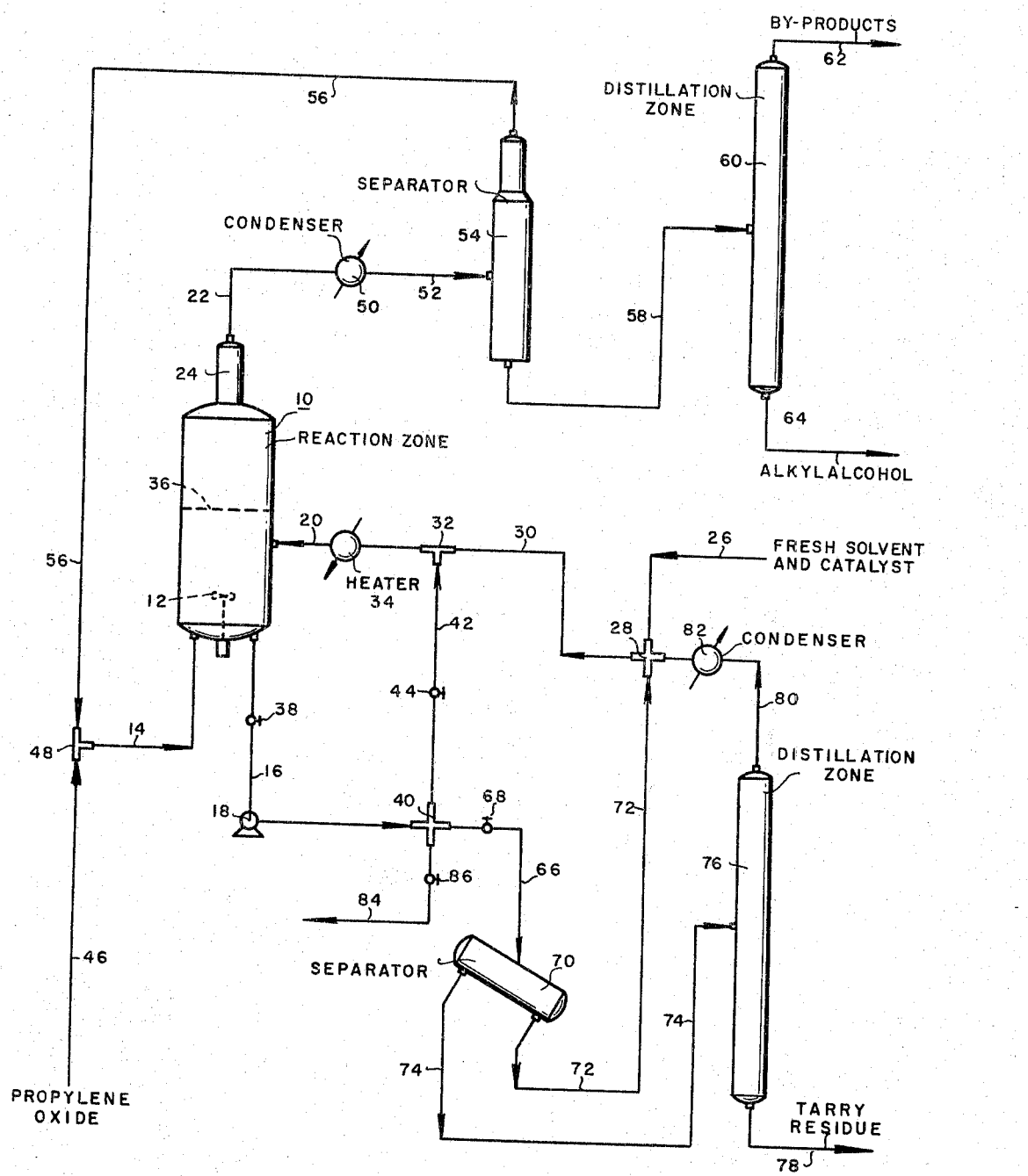

This application is a division of co-pending Rowton application, Ser. No. 143,724 filed Oct. 9, 1961, now U.S. Patent No. 3,238,624 and entitled "Isomerization Process and Catalyst Therefor."

This invention relates to the isomerization of epoxides. More particularly, this invention relates to the substantially selective production of alcohols by the isomerization of $C_3$ to $C_8$ hydrocarbon aliphatic 1,2-epoxides.

The invention will be further illustrated by the accompanying drawing wherein the figure is a schematic flow sheet illustrating a preferred method for the continuous practice for the process of the present invention.

It is known that aliphatic 1,2-hydrocarbon epoxides when heated will undergo rearrangement to form more stable compounds. For example, in Fowler U.S. Patent No. 2,426,264, there is disclosed a vapor phase process for the isomerization of propylene oxide by passing vaporized propylene oxide over a bed of a lithium phosphate catalyst at a temperature between 200° and 300° C. Yields of allyl alcohol within the range of about 67% to 85% are reported. However, prior art processes such as this, although generally satisfactory, have left much to be desired with respect to the results obtained. This is particularly so when there is desire to provide a continuous process.

It has now been surprisingly discovered in accordance with the present invention that hydrocarbon 1,2-epoxides can be substantially selectively isomerized to the corresponding alcohols by bringing the epoxide to be isomerized into contact with a slurry in a high boiling inert solvent of a solid catalyst prepared by the neutralization of lithium dihydrogen phosphate in aqueous solution with lithium hydroxide. The isomerization is preferably conducted at a temperature within the range of about 240° to about 300° C. at about atmospheric pressure, although higher pressure (e.g., up to 3000 p.s.i.g.) may be employed, if desired.

The feed stock to be utilized in accordance with the present invention is an aliphatic $C_3$ to $C_8$ hydrocarbon-1,2-epoxide such as propylene epoxide, butylene epoxide (e.g., 1,2-isobutylene oxide, butene-2-oxide), etc., and mixtures thereof. A preferred feed stock consists essentially of propylene epoxide, more commonly referred to as propylene oxide.

The inert diluent to be utilized in accordance with the present invention may be any suitable hydrocarbon or mixture thereof which will remain liquid at the reaction temperatures and pressures employed, which is non-reactive and which is thermally stable at the reaction temperatures and pressures employed. Preferably, the reaction is conducted at or above atmospheric pressure, and, therefore, the inert diluent is preferably a hydrocarbon boiling within the range of about 200° to about 350° C., such as a petroleum hydrocarbon gas oil fraction, a biphenyl compound, etc. A preferred diluent is biphenyl or a eutectic mixture of biphenyl with diphenyl oxide.

The novel catalyst composition of the present invention is a solid precipitate prepared by the neutralization of an aqueous solution of lithium dihydrogen phosphate with agitation with an aqueous solution of lithium hydroxide. The neutralization is suitably conducted at a temperature within the range of about −10° to about +15° C., the preferred temperature range being within the range of about 0° to about 5° C. It is necessary to use substantially stoichiometric amounts of the two reactants. Thus, the use of either an excess of acid or an excess of base is preferably avoided whereby the pH of the supernatant liquid will preferably be within the range of about 10.5 to about 11.0. The precipitate, after being recovered by any suitable means such as filtration, centrifugation, etc., is filtered and dried. However, the drying temperature should not exceed about 300° C. The resultant product is a very fine, very hard, brittle, almost glassy product having a particle size within the range of about 5 to about 100 microns.

In somewhat greater detail, the catalyst may be prepared from an aqueous solution of lithium hydroxide monohydrate in from about 200 to about 400 grams of water per gram mol of lithium hydroxide monohydrate. A separately prepared solution of one mol of 85% phosphoric acid in 0 to 100 ml. of water is added to one-third of the aqueous lithium hydroxide monohydrate solution to provide an aqueous solution of lithium dihydrogen phosphate. The remainder of the aqueous solution of lithium hydroxide monohydrate is then rapidly added to the aqueous solution of lithium dihydrogen phosphate with agitation at a temperature within the range of about 0° to about 10° C. to thereby provide a fine precipitate. The precipitate is then recovered and dried as described above. When this procedure is followed, the catalyst will have a particle size within the range of about 5 to about 100 microns, which is very desirable.

In conducting the process of the present invention, the catalyst of the present invention is added to an inert hydrocarbon such as a eutectic mixture of diphenyl with diphenyl oxide in an amount sufficient to provide a slurry containing from about 30 to about 60 grams of catalyst per 100 grams of slurry. If desired, from about 5 to about 50 wt. percent of the solid components of the slurry may be composed of an inert filler such as the gamma aluminas, pumice, etc.

The epoxide to be isomerized, such as propylene oxide, is then passed through the slurry at a temperature within the range of about 240° to about 300° C. and preferably at a space velocity within the range of about 400 to about 4000 grams of epoxide per liter of catalyst slurry per hour.

Under this set of conditions, from about 30% to about 40% of the epoxide, such as propylene oxide will be converted to isomerization products and from about 80% to about 95% of the conversion products will be allyl alcohol. By-products consist principally of propionaldehyde and acetone.

Although the reaction is exothermic, the use of a solvent, in accordance with the present invention, will normally require the addition of heat in order to maintain a desired reaction temperature. The kettle may be provided with a short fractionation column at the top of the reactor in order to condense and return any high-boiling liquid directly to the kettle.

The remaining vaporized materials may be cooled and the resultant off-gas and liquids may thereafter be fractionated in any desired manner in order to obtain a substantially pure allyl alcohol product.

Turning now to the drawing, which is a schematic flow sheet of a preferred method for the continuous practice of the present invention, there is schematically shown a reaction zone 10 provided with suitable agitating means, such as an impeller 12.

The reaction zone 10 is provided adjacent to the bottom thereof with a charge line 14 for the introduction of propylene oxide, and a liquid discharge line 16 containing a pump 18. Reaction zone 10 is also provided with a suitable liquids charge line 20 and a vapor discharge line 22. In accordance with the preferred embodiment of the present invention, the reaction zone 10 is provided adjacent to the top thereof with a suitable means 24 such as a short, single phase fractionation column for the condensation and return to the reaction zone 10 of any high-boiling liquids entrained in vapors to be discharged through the line 22.

To initiate the process, a slurry of the finely divided lithium phosphate catalyst of the present invention in a high boiling liquid solvent such as a eutectic mixture of biphenyl with diphenyl oxide is discharged by way of a charge line 26 through a manifold 28, a line 30 and a manifold 32 to the liquid charge line 20 for the reactor 10. In accordance with the embodiment of the invention shown in the drawing, the line 20 is provided with suitable heating means 34, such as a heat exchanger, in order to supply heat to the reaction zone 10. It will be understood, of course, that any other suitable heating means, such as internal heating coils and external heating coils may be employed, if desired. The slurry will preferably contain from about 30 to about 60 grams of catalyst per 100 grams of slurry. When a predetermined, desired liquid level, indicated by the dotted line 36, has been achieved in the reaction zone 10, a valve 38 in the discharge line 16 is opened to commence the recycle of liquid from reaction zone 10 through line 16, a manifold 40 and a recycle line 42 controlled by valve 44 to the manifold 32. Recycle is continued until a desired reaction temperature within the range of about 200° to about 300° C. has been obtained. Thereafter, propylene oxide is charged by a charge line 46 through a manifold 48 to the propylene oxide charge line 14 and reactor 10.

Propylene oxide, in passing through the liquid slurry in the reaction zone 10 will be partially isomerized by the lithium phosphate catalyst to allyl alcohol and to a minor extent to propionaldehyde and acetone. The resultant isomerization product, after passing through the liquid in the reaction zone 10, will pass through the rectifier 24 wherein entrained liquids are condensed to return to the liquid slurry and the resultant vapor will be discharged by way of discharge line 22 leading to a condenser 50 wherein the normally liquid allyl alcohol, propionaldehyde and acetone components of the off gas are condensed. The resultant mixture is discharged from condenser 50 by way of a line 52 leading to separator 54 wherein unreacted propylene oxide separates from the condensed liquids for discharge overhead by way of a line 56 to the manifold 48 for the recycle of propylene oxide.

The condensed liquid components are discharged from separator 54 by way of a line 58 leading to a distillation zone which is shown in the drawing as a single distillation column 60. It will be understood that, if desired, the distillation zone 60 may comprise a plurality of distillation columns for the purification of the allyl alcohol product and for the separation or isomerization of by-products.

In accordance with the showing, the liquid isomerization products are separated in zone 60 into overhead by-products fraction 62 and an allyl alcohol fraction 64.

With the passage of time, tars will commence to form in the reaction zone 10 which will significantly and adversely affect reaction unless removed.

In accordance with the present invention, tar removal is accomplished by leading a portion of the slurry normally recycled through the line 42 from manifold 40 to a line 66 controlled by a valve 68 leading from the manifold 40 to a separator 70. Within the separator 70, the slurry will separate into a supernatant solvent-phase containing a significant percentage of the tarry residues and a lower lithium phosphate phase containing a reduced amount of tars and most of the catalyst. The lower lithium phosphate phase may be discharged from separator 70 by way of a line 72 leading to a manifold 28 interconnected with a line 30 and manifold 32 for the liquid charge line 20 to the reaction zone 10.

The supernatant liquid is charged by line 74 to a distillation zone 76 and there separated into a tarry residue fraction which is discharged by way of a bottoms line 78 and an overhead solvent fraction which is discharged by way of a line 80 containing condenser 82 leading to manifold 28, mentioned above.

By operating in this manner, continuous operations may be conducted for long periods of time without deactivation of the catalyst.

It will be understood that, if desired, tars may be removed from the system by a total discharge of a portion of the liquid slurry through a discharge line 84 controlled by valve 86 leading from the manifold 40 and by replacing the discarded material with an equivalent amount of fresh solvent and fresh catalyst charged to the system by way of a line 26 leading to a manifold 28.

The invention will be further illustrated by the following specific examples which are given by way of illustration and not as limitations on the scope of this invention.

*Example I*

One-third of a solution of 123 grams of lithium hydroxide monohydrate (55.6% LiOH) in 640 ml. of water was added to 109 grams of 85% phosphoric acid in 20 ml. of water. After the resulting solution had been cooled to room temperature, 190 grams of ice was added. To the remainder of the base was added 200 grams of ice. Both solutions were stirred until their temperatures were about 2° C. The lithium dihydrogen phosphate solution was then poured as rapidly as possible into the lithium hydroxide solution. The suspension was diluted to 4000 ml. and allowed to stand overnight. The pH of the supernatant liquid was 10.9. The precipitate was filtered and dried at 110° C. without further washing.

The lithium phosphate catalyst was ground to a powder and passed through a 140-mesh screen. A mixture of 50 grams of catalyst powder in 310 grams of diluent (a eutectic mixture of biphenyl with diphenyl oxide) was placed in an electrically heated 300 ml. glass kettle, 5 cm. in diameter and 16 cm. high, equipped with a mechanical-type gas disperser, a propylene oxide inlet, a diluent inlet, a thermowell and a fractionating column, 50 cm. in length and 2 cm. in internal diameter, packed with ¼ inch stainless steel protruded packing. Nitrogen was introduced while the slurry temperature was raised to 240° C. Liquid propylene oxide, 500 ml., was pumped by means of a bellows pump at a rate of 1.3 ml./min. to a vaporizer tube maintained at 175° to 275° C., from which the oxide vapors passed through a jet beneath the mechanical disperser into the slurry. The reaction products, along with unreacted propylene oxide, passed out of the fractionating column at 65° to 75° C. and were collected in a receiver equipped with a Dry Ice condenser. The reactor effluent was analyzed by gas chromatography and the analysis confirmed by distillation. Tars were determined by noting the increase in weight of the catalyst slurry relative to that in a blank run in which an inactive catalyst was used.

The following results were obtained.

Conversion: 38%

| Reaction products: | Percent |
|---|---|
| Carbonyl compounds (propionaldehyde and acetone) | 5.9 |
| Allyl alcohol | 88.6 |
| Other volatile materials | 1.6 |
| Tars | 3.9 |

This represents a production rate of 0.7 gram of allyl alcohol/gram of catalyst/hour, or 225 grams of allyl alcohol/liter of catalyst slurry/hour.

*Example II*

A lithium phosphate catalyst was prepared by slowly adding a solution of 109 grams of 85% phosphoric acid in 600 ml. of water to a solution of 123 grams of lithium hydroxide monohydrate in 6000 ml. of water at room temperature. The coarse precipitate was washed five times by decantation, filtered and dried. When this product was tested for catalytic activity as described in Example I, only a 21% conversion and an 80% yield of allyl alcohol was obtained.

*Example III*

A catalyst was prepared as described in Example I except that water was replaced with methanol. The soft catalyst obtained, when tested as described in Example I, gave only 3% conversion and a carbonyl to allyl alcohol ratio of 7:1.

*Example IV*

A solution of 1940 grams of lithium chloride in 13.3 liters of water was added to a stirred solution of 2280 grams of trisodium phosphate in 25.8 liters of water at room temperature. The precipitate was washed free of chloride, filtered and dried at 120° C. When this catalyst was tested in a manner comparable to that described in Example I, an 84% yield of allyl alcohol was obtained, but only 4% of the propylene oxide feed underwent conversion.

*Example V*

This example illustrates the effect of tars on catalyst activity. A one gallon steel kettle, similar in design to the glass vessel described in Example I, was charged with two pounds of powdered catalyst and five pounds of the diluent of Example I. When the temperature of the catalyst slurry reached 240° C., propylene oxide was fed in at a rate of 2.4 pounds/hour. The initial conversion was 33%. After 230 hours of operation, conversion had dropped to 24%. Alcohol yields throughout the run ranged from 80% to 85%. During the run, diluent was slowly removed along with the reaction products, and the tars were permitted to accumulate in the kettle. Thus, the concentration of tars must become quite high before catalyst activity is seriously affected.

*Example VI*

The glass reactor described in Example I was charged with 50 grams of the same Example I catalyst and 130 grams of diluent. When the operating temperature reached 240° C., isobutylene oxide was fed into the catalyst slurry at a space velocity of 490 grams of oxide/liter of catalyst slurry/hour. There was no evidence of tar formation. The product issuing from the reactor had the following composition:

| Compound: | Percent |
|---|---|
| Isobutylene oxide | 19.2 |
| Isobutyraldehyde | 7.2 |
| Methallyl alcohol | 72.8 |
| Unidentified substance | 0.8 |

Thus, a 90% yield of methallyl alcohol was obtained at 81% conversion.

What is claimed is:

1. A trilithium phosphate catalytically active for the selective isomerization of aliphatic hydrocarbon 1,2-epoxides to the corresponding allyl alcohols prepared by rapidly contacting, with agitation, an aqueous solution of lithium dihydrogen phosphate at a temperature of about −10° to about +15° C. with an aqueous solution of an equivalent amount of lithium hydroxide, thereby providing a trilithium phosphate precipitate, separating and collecting said trilithium phosphate precipitate, and drying said precipitate at a temperature of not greater than 300° C.

2. A process for the preparation of a trilithium phosphate catalyst comprising the steps of rapidly contacting, with agitation, an aqueous solution of lithium dihydrogen phosphate at a temperature of from about −10° to about +15° C. with an aqueous solution of an equivalent amount of lithium hydroxide, thereby providing a trilithium phosphate precipitate, separating and collecting said precipitate, and drying said precipitate at a temperature of not greater than 300° C. to thereby provide a trilithium phosphate catalytically active for the selective isomerization of aliphatic hydrocarbon 1,2-epoxides to allyl alcohols.

References Cited

UNITED STATES PATENTS 3,044,850  7/1962  Denton _____ 23—107

OSCAR R. VERTIZ, *Primary Examiner.*

MILTON WEISSMAN, *Examiner.*

O. F. CRUTCHFIELD, *Assistant Examiner.*